United States Patent
Atkins et al.

(10) Patent No.: US 9,642,501 B2
(45) Date of Patent: May 9, 2017

(54) SOAP DISPENSER WITH AUTHENTICATION CHECK OF THE REFILL

(75) Inventors: Peter Atkins, Montvale, NJ (US); Mohammad S. Farahat, Wyckoff, NJ (US); Wu Jin, Dongguan (CN); Jackie Tsang, Dongguan (CN); Jacobus Simon Petrus Van Diepen, Dongguan (CN)

(73) Assignees: Reckitt Benckiser LLC, Parsippany, NJ (US); Sun Chemical Corporation, Parsippany, NJ (US)

( * ) Notice: Subject to any disclaimer, the term of this patent is extended or adjusted under 35 U.S.C. 154(b) by 208 days.

(21) Appl. No.: 14/122,671

(22) PCT Filed: May 25, 2012

(86) PCT No.: PCT/GB2012/051186
§ 371 (c)(1),
(2), (4) Date: Mar. 12, 2014

(87) PCT Pub. No.: WO2012/164267
PCT Pub. Date: Dec. 6, 2012

(65) Prior Publication Data
US 2014/0197192 A1    Jul. 17, 2014

Related U.S. Application Data

(60) Provisional application No. 61/490,691, filed on May 27, 2011.

(30) Foreign Application Priority Data

Oct. 20, 2011 (GB) .................................. 1118109.6

(51) Int. Cl.
  *B67D 7/06*   (2010.01)
  *A47K 5/12*   (2006.01)
  (Continued)

(52) U.S. Cl.
  CPC ............ *A47K 5/1217* (2013.01); *B05B 9/085* (2013.01); *G07F 13/025* (2013.01); *G07F 17/18* (2013.01)

(58) Field of Classification Search
  CPC ....... A47K 5/1217; B05B 9/085; G07F 17/18; G07F 13/025
  (Continued)

(56) References Cited

U.S. PATENT DOCUMENTS 6,006,991 A      12/1999 Faklis et al.
8,071,933 B2 *   12/2011 Ophardt ............... A47K 5/1217
                                                    222/181.1

(Continued)

FOREIGN PATENT DOCUMENTS

DE    10254248 A1    6/2004
EP    1671568        6/2006
(Continued)

OTHER PUBLICATIONS

International Search Report and Written Opinion mailed Aug. 27, 2012 for priority application PCT/GB2012/051186.
(Continued)

*Primary Examiner* — Kevin P Shaver
*Assistant Examiner* — Robert Nichols, III
(74) *Attorney, Agent, or Firm* — Troutman Sanders LLP; Ryan A. Schneider; Chris N. Davis

(57) ABSTRACT

A dispenser for dispensing a product, the dispenser comprising a base unit (2) into which a refill (1) containing the product is removably insertable in a fixed position. The refill has a taggant ink (12) on part of its external surface. The base has a light source (13) to illuminate the ink. The light source has a first wavelength and the ink is arranged to cause the ink to emit light at a second different wavelength. A sensor (14) receives light emitted by the ink upon illumi-
(Continued)

nation by the light source. A control circuit receives signal indicative of the wavelength of the detected light from the sensor, compares it with stored data, and prevents operation of a dispensing mechanism unless the refill is authentic.

16 Claims, 2 Drawing Sheets

(51) Int. Cl.
    *G07F 17/18*     (2006.01)
    *G07F 13/02*     (2006.01)
    *B05B 9/08*     (2006.01)

(58) Field of Classification Search
    USPC ........................................ 222/23, 181.1, 325
    See application file for complete search history.

(56) References Cited

U.S. PATENT DOCUMENTS

| 2005/0127090 A1 | 6/2005 | Sayers | |
| 2008/0025594 A1* | 1/2008 | Metzger | G07F 7/086 |
| | | | 382/141 |
| 2011/0253744 A1* | 10/2011 | Pelfrey | A47K 5/1217 |
| | | | 222/52 |
| 2014/0231448 A1* | 8/2014 | Wegelin | B05B 1/00 |
| | | | 222/23 |

FOREIGN PATENT DOCUMENTS

| EP | 1824760 | 8/2007 |
| EP | 2033555 A1 | 3/2009 |
| GB | 2376682 A | 12/2002 |
| JP | 2004237489 A | 8/2004 |
| WO | 9636556 A1 | 11/1996 |
| WO | 9636557 A1 | 11/1996 |
| WO | 0106453 A1 | 1/2001 |
| WO | 2009086120 | 7/2009 |

OTHER PUBLICATIONS

Combined Search and Examination Report dated Feb. 8, 2012 for priority Application No. GB1118109.6.

* cited by examiner

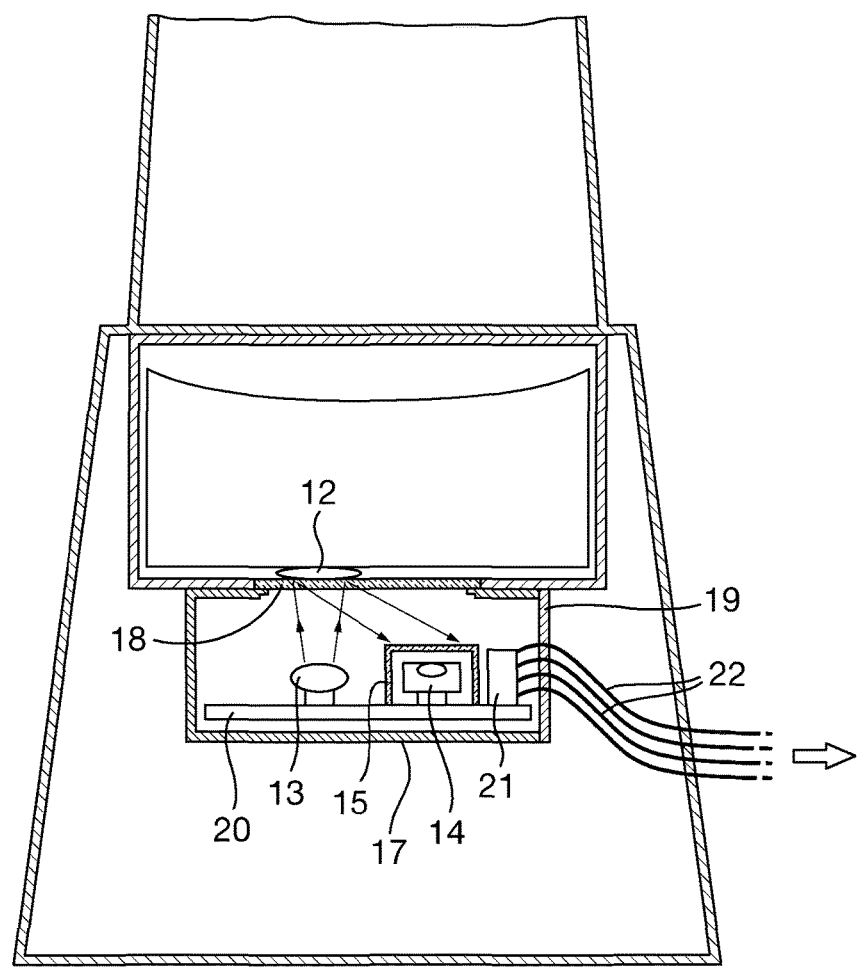

SOAP DISPENSER WITH AUTHENTICATION CHECK OF THE REFILL

CROSS-REFERENCE TO RELATED APPLICATIONS

This application is a US National Stage of International Application No. PCT/GB2012/051186, filed 25 May 2012, which claims the benefit of U.S. Provisional Patent Application No. 61/490,691, filed 27 May 2011, and GB 1118109.6, filed 20 Oct. 2011, all herein fully incorporated by reference.

The present invention relates to a dispenser for dispensing a product.

In particular, it relates to a dispenser of the kind having a base unit containing a dispensing mechanism and a refill which is removably insertable into the base.

Such dispensers can be used, for example, for dispensing fluids. These may be liquid soaps and the like, or may be used to dispense fluid food stuff such as sauces with a mustard or ketchup-like consistency. They may also be aerosol type dispensers for dispensing air freshener and the like, or dispensers for solid objects such as tabs, lozenges or wipes.

With such dispensers, there is a general desire to authenticate the refill which is placed in the dispenser in order to maintain quality control, and for safety reasons, to prevent dispensing a sub-standard or hazardous product.

One way of doing this is to use a magnet on the refill which is brought into proximity with a reed switch on the base in order to complete a circuit. This is disclosed in our own earlier EP 1 824 760. This idea provides a simple and cost-effective authentication system. However, it is easy for a non-authorised refill to be produced simply by providing a magnet at the correct location. Further, the system lacks versatility as the base can only ever detect one type of refill. It cannot be configured to detect different refills in different products.

A further known method of authentication is disclosed in EP 1 671 568 and uses an electronic key, such as an RFID tag. Such tags can be programmed with a unique identifier. The base is then provided with control circuitry which reads the RFID tag and, if it detects that the tag with an authorised code is present, it will allow the dispensing mechanism to operate to dispense liquid. If no such tag is identified, it will prevent operation of the dispensing mechanism. Although such systems are commonly used, they are relatively expensive in that they require each refill to be provided with an RFID tag. In a low-cost system, where every penny which can be shaved off the cost of the refill is critical, this expense can be significant.

Also known in the art are optical systems, such as that disclosed in WO 96/36556. This is based on bar-code technology and uses a scanning light which scans the bar-code to check that the container is authentic, and to obtain information about the nature of the product in the refill which has a bearing on the subsequent operation of the dispenser.

Such devices have a number of drawbacks. The requirement for a bar-code on the refill means that a relatively large area of the product must be taken up with the bar-code which detracts from the appearance of the refill. Also, the physical size of the bar-code, together with the space required for the scanner which detects the bar-code means that the space required for such a system is relatively large. Also, the fact that a bar-code is readily visible in normal use means that it can readily be copied onto an unauthorised product.

Given the size and complexity of such a system, this has generally only been used in relatively large-scale mains-powered machines such as beverage dispensers. As far as we are aware, this has not been used on a smaller scale dispenser, for example, one which is capable of being battery-powered.

The applicant has previously tried a crude bar-code system in their Airwick® Freshmatic® which has two dark bars separated by a light bar and an optical sensor which detects the reflected light as the bar is moved past the sensor. Such a system works well for this device where the bars are on a moving part of the device. However, to adapt the same system for a refill with no moving parts becomes much more complex.

The applicant has, in the past, tried all of the above magnetic, RFID and bar-code based systems but has, until now, been unable to produce an authentication system for a re-fillable dispenser which provides the required combination of cost and security.

WO 2009/086120 discloses a sensor for dispensing sheets of material. It has an authentication reader which reads a mark on the roll as it is dispensed from the dispenser. If it fails to recognise an authentication mark, it determines that the refill is unauthorised and dispenses it at a faster rate. The idea is to deter the use of unauthorised product by ensuring that this is used up at a faster rate. This document discloses a non-exhaustive list of suitable sensors which include barcodes, RFID tags, fluorescent or phosphorescence inks, conductive particles, fibers, metals, tick marks or ridges. Similarly, JP 2004/237489 discloses a roll of thermal paper that is provided with an ink based authentication mark which may be fluorescent or luminescent. In both cases, the dispensers require the roll of material to be moved past the sensor in order to allow the sensor to read the authentication mark. As such, the mark must be continuous or repeat frequently along the length of the material. Both devices are relatively large scale mains powered devices that again require some relative movement in order to function.

The present invention aims to provide a cost-effective authentication system suitable for use with relatively small-scale, low-cost dispensers.

According to the present invention, there is provided a dispenser for dispensing a product, the dispenser comprising a base unit containing a dispensing mechanism for dispensing the product; a refill containing the product and being removably insertable into the base in a fixed position in which the product can be dispensed by the dispensing mechanism, the refill having a taggant ink on part of its external surface; the base being provided with a light source positioned to illuminate the ink when the refill is inserted into the base in the correct orientation, the light source having a first wavelength and the ink being arranged to cause the ink to emit light at a second different wavelength; a sensor to receive light emitted by the ink upon illumination by the light source; and a control circuit to receive a signal indicative of the wavelength of the detected light from the sensor, compare it with stored data to determine whether the shift in wavelength of the detected light caused by the ink indicates that the refill is authentic, and prevent operation of the dispensing mechanism unless the refill is authentic.

The present invention provides a number of advantages over the known authentication systems.

It is far more secure than a magnet based system or barcode as the taggant inks are impossible, in practice, to copy. This taggant ink also provides for greater security than the inks mentioned in WO 2009/086120 and JP 2004/237489.

The present invention also provides a very low-cost solution, particularly in relation to the refill pack. Given the fixed nature of the refill in the base, only a very small amount of ink is needed. Estimates suggest that the cost of adding a taggant ink to the refill is some 20% of the cost of including an RFID tag. Also, the light source and sensor are relatively cheap as there is no requirement for a scanning source as there is for example, for a barcode system.

The present invention also provides versatility in that different inks can be printed on refills containing different substances and the control circuit can be programmed to detect these different inks and, if necessary, operate the dispensing mechanism differently for the different liquids.

The taggant, also known as a tagged sensor ink is a high security ink available, for example, from Sun Chemical Security, Gans Ink or Flint Group.

With such an ink, the ink provider also provides the sensor and control circuitry to detect specific characteristic signal emitted by the ink. Such inks are known in high security applications such as document authentication.

The present invention also extends to a refill for a dispenser for dispensing a product, the refill containing product and being removably insertable into a base in a position in which the product can be dispensed by the dispensing mechanism, the refill having a taggant ink on part of its external surface.

The invention also extends to the base unit, per se, and to a method of using the dispenser.

The refill will generally have a non-absorbent surface as it will be made of a material such as plastics or metal. The ink must be securely attached to the reservoir as, if it is accidentally scraped or knocked off when the user inserts the refill into the dispenser. The refill will not work which will be highly irritating.

Therefore, preferably, the ink is a two-part cross-linked epoxy formulation. This has high adhesion properties. This is preferably applied by a pad or screen printing process. It may be a combination of a cross-linked pad print and a flexo solvent formula. Alternatively, the ink is applied by an ink jet printing process. The ink may be cured with UV light. As a further alternative, the ink may be on a label which is stuck to the refill, or applied using an in-mould technique.

One particular application for the present invention is Dettol® No-Touch® dispenser. In such a dispenser, the refill has an outlet at its lower end and is arranged to be inserted with the outlet lowermost into the base. In such a refill, the ink can be printed on the side surface of the lid surface of the refill. However, preferably, the ink is printed on the lowermost surface of the refill. This means that the optical light source and sensor can be positioned where the least amount of ambient light is able to penetrate.

An example of a dispenser and refill in accordance with the present invention will now be described with reference to the accompanying drawings, in which:

FIG. 2 is a schematic view of the authentication mechanism of the present invention.

Figure 1:
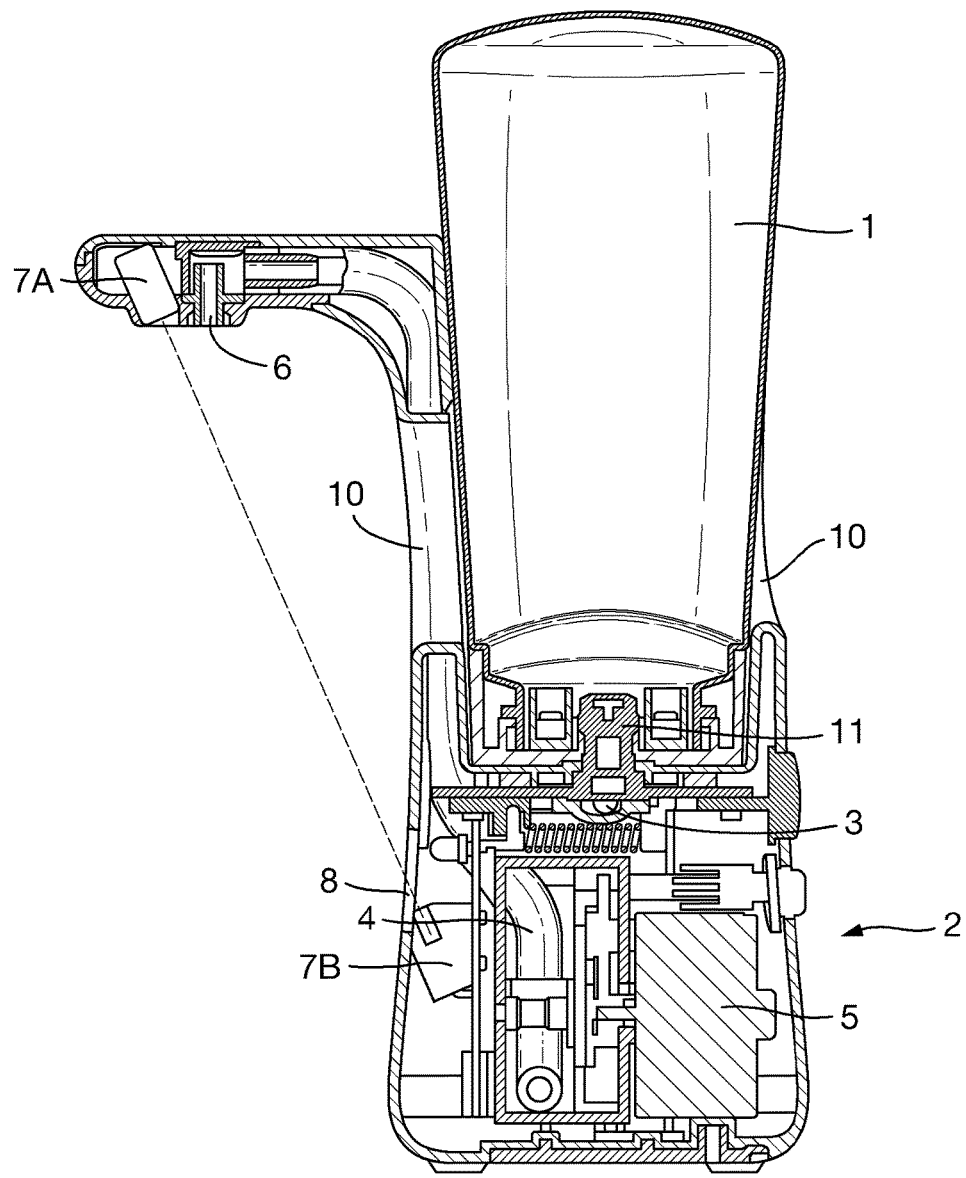
FIG. 1 is a cross-section through the Dettol® No-Touch® product.

While the invention is being described with relation to a particular product, it will be appreciated that it may be used for any dispenser in which a refill is removably insertable into a base. It may, for example, be battery-powered or mains powered. It may be free-standing, built-in to a wall or other surround, or be hand-held.

The dispenser of FIG. 1 is a hands-free dispenser which is generally suitable for domestic use. The dispenser is primarily intended to dispense liquid soap, but may also be used to dispense other liquid or semi-liquid products (ideally with a viscosity greater than water), such as hand cream, body lotion, moisturiser, face cream, shampoo, shower gel, foaming hand wash, shaving cream, washing up liquid, toothpaste, acne treatment cream, lubricant, a surface cleaner or a sanitising agent such as alcohol gel.

The dispenser comprises two main parts, namely a refill 1 and a base unit 2. The refill 1 provides a reservoir of liquid to be dispensed and is fitted to the base unit 2 as set out below.

The base has an interface 3 into which liquid is dispensed from the refill unit. The interface 3 is in fluid communication with a dispensing tube 4. A pump 5 is selectively operable to pump a metered dose of the liquid along dispensing tube 4 and out of dispensing head 6.

The base has an infrared transmitter 7A which transmits an infrared beam through a window 8 to a receiver 7B to sense the presence of a user's hands in the vicinity of the dispenser. Control circuitry reacts to a signal from the proximity sensor to activate the pump. The illustrated sensor is a break beam sensor, but may also be a reflective sensor. Although an infrared sensor is shown, any known proximity sensor such as a capacitive sensor may be used.

The base unit 2 comprises a cowling 10 which forms a cup-shaped housing surrounding a significant portion of the refill to protect and support it. A spigot 11 projects through the base of the cowling 10 to displace a valve and allow fluid into the base unit 2 for dispensing.

A small spot of a taggant ink 12 is applied to the bottom face of the refill unit. Taggant inks are high security inks available, for example, from Sun Chemical Security, Gans Inc. or Flint Group. In such an ink, the optics described below are also provided by the ink provider as they form a complementary pair with the ink.

The refill unit is made from, for example, of polypropylene. This is a type of plastic with relatively low surface energy as determined by DIN 533364 or ASTM D2578 test methods (approximately 29 Dyn/cm), which causes poor adhesion when an ink is printed on it. In order to enhance the adhesion of an ink on polypropylene its surfaces energy needs to be raised above that of the ink. For an organic solvent based ink the surface energy of the polypropylene surface should increase above 40-42 Dyn/cm in order to achieve good adhesion. In addition, use of a highly cross-linked ink will also enhance adhesion on polypropylene. High cross linking may be achieved by using two part inks that consist of a base ink and a cross linking promoting additive.

As shown in FIG. 2, the base is provided with a blue LED 13. Next to the blue LED 13 is a sensor 14 covered by a filter 15 to cut-out light reflected or scattered from the LED. In this case, the filter is orange to cut out the blue light.

The combination of the LED 13, sensor 14 and filter 15 are contained within a housing 17 which has a window 18 through which the light is transmitted to and received from the ink 12. The side of the housing 17 is formed as a separate part 19 to the remainder of the housing. The above described components are mounted on a circuit board 20 which is slid into the housing which is then sealed by the side part 19 of the housing. The circuit board has a plug 21 from which cables 22 extend via a seal in the side part 19 of the housing.

When the refill 1 is inserted into the base unit, the position of the refill is fixed such that the two are precisely aligned so that the taggant ink 12 faces the optics in the base unit preserving the arrangement shown in FIG. 2. The refill is fixed in the sense that it does not move with respect to the base during the dispensing operation. Before authentication, the dispenser may dispense once to prime the pump. In this position, light from the LED is incident on the ink 12. To calibrate the device to allow for ambient light, the LED is turned on and off. The 'off' reading is then used by the controller to subtract the ambient light reading from the signal from the sensor when the LED is on. The ink causes the wavelength of the light to be altered. The emitted light is then detected by the sensor 14.

Control circuitry then compares the signal received by the sensor 14 with stored data representing a wavelength and/or intensity value associated with the fluorescent ink on an authentic refill. In the case of taggant (also known as a tagged sensor ink), the signature for a particular tagged sensor ink is initially determined by spectroscopic and mathematical analysis of the wavelength and/or intensity data obtained on various samples that are printed on with the tagged sensor ink. Subsequently, this signature is programmed into the control circuitry of the dispensing device. If the signals from sensor 14 satisfy the test conditions that are represented by the stored signature, the control circuit enables the operation of the dispensing mechanism. If the signal fails, the unit will repeat the process a number of times before providing an error indication such as a flashing light and it does not operate the dispensing mechanism. The light will flash for a short while and then the dispenser will return to a standby mode in which it will again attempt its authentication routine if the infrared beam is broken.

The invention claimed is:

1. A dispenser for dispensing a product, the dispenser comprising a base unit containing a dispensing mechanism for dispensing the product;
   a refill containing the product and being removably insertable into the base unit in a fixed position in which the product can be dispensed by the dispensing mechanism, the refill having a taggant ink on part of its external surface;
   the base unit being provided with a non-scanning light source positioned to illuminate the taggant ink when the refill is inserted into the base unit in the correct orientation, the light source having a first wavelength and the taggant ink being arranged to cause the taggant ink to absorb light at the first wavelength and to emit light at a second different wavelength;
   a sensor to receive light emitted by the taggant ink upon illumination by the light source; and
   a control circuit to receive a signal indicative of the wavelength of the detected light from the sensor, compare it with stored data to determine whether the shift in wavelength of the detected light caused by the taggant ink indicates that the refill is authentic, and prevent operation of the dispensing mechanism unless the refill is authentic.

2. The dispenser according to claim 1, wherein the product is a fluid.

3. The dispenser according to claim 1, wherein more than one taggant ink is printed on part of the external surface of the refill.

4. The dispenser according to claim 1, wherein the refill has an outlet at its lower end and the taggant ink is printed on the lower end of the refill.

5. The dispenser according to claim 1, wherein the taggant ink is a two-part cross-linked formulation.

6. A method of dispensing a product from the dispenser according to claim 1, the method comprising:
   inserting the refill into the base unit;
   illuminating the light;
   sensing the light received from the taggant ink;
   comparing the detected light with stored data to determine whether the shift in wavelength of the detected light caused by the taggant ink indicates that the refill is authentic; and
   allowing operation of the dispensing mechanism if the refill is authentic.

7. The dispenser according to claim 1, wherein the taggant ink comprises printed taggant ink.

8. A refill for a dispenser for dispensing a product, the refill containing product and being removably insertable into a base unit in a fixed position in which the product can be dispensed by the dispensing mechanism, the refill having a tagged sensor ink on part of its external surface, the tagged sensor ink being arranged to absorb light at a first wavelength and to emit light at a second different wavelength.

9. The refill according to claim 8 containing a fluid.

10. The refill according to claim 8, wherein the tagged sensor ink is a two-part cross-linked formulation.

11. The refill according to claim 8, wherein the tagged sensor ink is applied by an inkjet printing process.

12. The refill according to claim 8, wherein the tagged sensor ink is applied by a pad or screen printing process.

13. The refill according to claim 6, wherein the tagged sensor ink is on a label which is stuck to the refill.

14. The refill according to claim 8, wherein the tagged sensor ink comprises printed tagged sensor ink.

15. A base unit for a dispenser for dispensing a product, the base unit containing a dispensing mechanism for dispensing the product;
   a means for removably receiving a refill in a fixed position in which the product can be dispensed by the dispensing mechanism, the refill having a taggant ink on part of its external surface;
   the base unit being provided with a non-scanning light source positioned to illuminate the taggant ink when the refill is inserted into the base unit in the correct orientation, the light source having a first wavelength and the taggant ink being arranged to absorb light at the first wavelength and to emit light at a second different wavelength;
   a sensor to receive light emitted by the taggant ink upon illumination by the light source; and
   a control circuit to receive a signal indicative of the wavelength of the detected light from the sensor, compare it with stored data to determine whether the shift in wavelength of the detected light caused by the taggant ink indicates that the refill is authentic, and prevent operation of the dispensing mechanism unless the refill is authentic.

16. The base unit according to claim 15, wherein the taggant ink comprises printed taggant ink.

* * * * *